United States Patent
Chan et al.

(10) Patent No.: US 10,313,140 B2
(45) Date of Patent: Jun. 4, 2019

(54) POWER DISTRIBUTION UNIT, POWER DISTRIBUTION SYSTEM AND NETWORK-CONNECTING RELAY METHOD THEREOF

(71) Applicant: Delta Electronics, Inc., Taoyuan (TW)

(72) Inventors: Chih-Chiang Chan, Taoyuan (TW); I-Chieh Li, Taoyuan (TW); Wei-Yu Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/624,127

(22) Filed: Jun. 15, 2017

(65) Prior Publication Data

US 2018/0139065 A1    May 17, 2018

(30) Foreign Application Priority Data

Nov. 11, 2016  (CN) .......................... 2016 1 0994330

(51) Int. Cl.
*H04L 12/00*  (2006.01)
*H04L 12/10*  (2006.01)
*H04L 12/24*  (2006.01)
*H04L 12/403* (2006.01)
*H04L 12/26*  (2006.01)

(52) U.S. Cl.
CPC ............ *H04L 12/10* (2013.01); *H04L 12/403* (2013.01); *H04L 41/0654* (2013.01); *H04L 43/08* (2013.01); *Y04S 40/168* (2013.01)

(58) Field of Classification Search
CPC ................. H04L 43/08; G06F 13/4282; G05B 2219/25032; B60H 1/00978; H02J 13/0062; H02J 3/06
See application file for complete search history.

(56) References Cited

U.S. PATENT DOCUMENTS

| | | |
|---|---|---|
| 2005/0136989 A1 | 6/2005 | Dove |
| 2010/0268579 A1 | 10/2010 | Momoh |
| 2011/0320065 A1 | 12/2011 | Ying |
| 2014/0077596 A1* | 3/2014 | Nishibayashi ............ H02J 1/00 307/29 |
| 2017/0371819 A1* | 12/2017 | Lin ........................ G06F 13/364 |
| 2017/0373926 A1* | 12/2017 | Shang ................. H04L 41/0654 |

* cited by examiner

*Primary Examiner* — Mohamed A Kamara
(74) *Attorney, Agent, or Firm* — Muncy, Geissler, Olds & Lowe, P.C.

(57) ABSTRACT

A power distribution system capable of network-connecting relay is provided. Power distribution units of the power distribution system execute a master-node-arbitrating process to generate an arbitration result, and respectively switch to a master node mode for being a master node or a slave node mode for being a slave node according to the arbitration result. When being the master node, a power distribution unit receives a monitor command from a remote management device via an external network, and transfers it to the corresponded slave node(s). When being the slave node, a power distribution unit executes the monitor command received from the master node. Therefore, the complexity of building system and the cost of building system can be effectively reduced, and network-connecting relay service can be provided.

19 Claims, 8 Drawing Sheets

POWER DISTRIBUTION UNIT, POWER DISTRIBUTION SYSTEM AND NETWORK-CONNECTING RELAY METHOD THEREOF

BACKGROUND OF THE INVENTION

Field of the Invention

The technical field relates to a device, system and method, and more particularly related to a power distribution unit, power distribution system and network-connecting relay method thereof.

Description of Related Art

Power distribution unit (PDU) is a device capable of distributing electric power of a power source to a plurality of electronic apparatus according to the user's requirement.

In view of the requirement of remote monitoring, a conventional network PDU is provided and the user can remotely monitor the power input/output status of the network PDU via network.

Although the network PDU of the related art has the advantage of remote monitoring, in the case of arranging numerous network PDUs (such as data center), because each network PDU must be connected to the external network for remote monitoring, the disposition of each network PDU is greatly limited such that the complexity of building system increases substantially.

Besides, for connecting the external network, numerous network PDUs must occupy a great number of IP addresses such that increasing the cost of building system.

SUMMARY OF THE INVENTION

One aspect of the present disclosed example is directed to a power distribution unit, power distribution system and network-connecting relay method thereof which are configured for a relay communication with network connection using the master-slave architecture.

One of the exemplary embodiments is a network-connecting relay method adopted in a power distribution system, and the power distribution system comprises a plurality of power distribution units; the network-connecting relay method comprises:

a) the power distribution units executing a master-node-arbitrating process for generating arbitration result;

b) each power distribution unit switching to a master node mode for being a master node or switching to a slave node mode for being a slave node according to the arbitration result;

c) receiving a monitor command from a remote management device via an external network, and transferring the monitor command to the corresponded slave node when being the master node; and d) executing the monitor command received from the master node when being the slave node.

One of the exemplary embodiments, a power distribution unit capable of network-connecting relay, comprises:

a control unit, controlling the power distribution unit to switch to a master node mode for making the power distribution unit be a master node or switch to a slave node mode for making the power distribution unit be a slave node;

a network unit electrically connected to the control unit, receiving a monitor command from a remote management device when the power distribution unit is the master node; and a communication unit electrically connected to the control unit, transferring the monitor command to another power distribution unit being the slave node when the power distribution unit is the master node, receiving a monitor command from another power distribution unit being the master node when the power distribution unit is the slave node, wherein the control unit executes a master-node-arbitrating process with another power distribution unit for generating an arbitration result when the power distribution unit is slave node and the master node malfunctions, and determines whether the control unit controls the power distribution unit to switch to the master node mode for making the power distribution unit be the new master node for network-connecting relay.

One of the exemplary embodiments, a power distribution system capable of network-connecting relay, comprises:

a plurality of above-mentioned power distribution units, each power distribution unit operates respectively in the master node mode for being the master node or in the slave node mode for being the slave node according to the arbitration result of the master-node-arbitrating process.

The present disclosed examples can effectively reduce the complexity of building system, reduce the cost of building system and provide network-connecting relay service.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

First, the technical principle of the present disclosed example will be briefly described. The present disclosed example is to improve the Daisy Chain architecture to provide a master-slave architecture having capable of network-connecting relay, and further provides a power distribution system and network-connecting relay method thereof.

Above-mentioned master-slave architecture comprises the master node(s) and the slave node(s). The master node has capable of connecting an external network, and can receive a user's monitor operation via the external network. Besides, in the present disclosed example the master node can be a relay access point so as to provide the user to monitor and operate the slave node via the master node, or provide the slave node return data to the user via the master node. In one embodiment, above-mentioned master-slave architecture only comprises single master node.

Thus, in the present disclosed example, the slave node can indirectly connect to the external network via the master node without laying external network cables. Besides, because only the master node connects to the external network actually, the user only needs to distribute the IP address to the master node, and doesn't have to distribute the IP address to the slave node, so as to saving the usage of the IP address.

Figure 1:
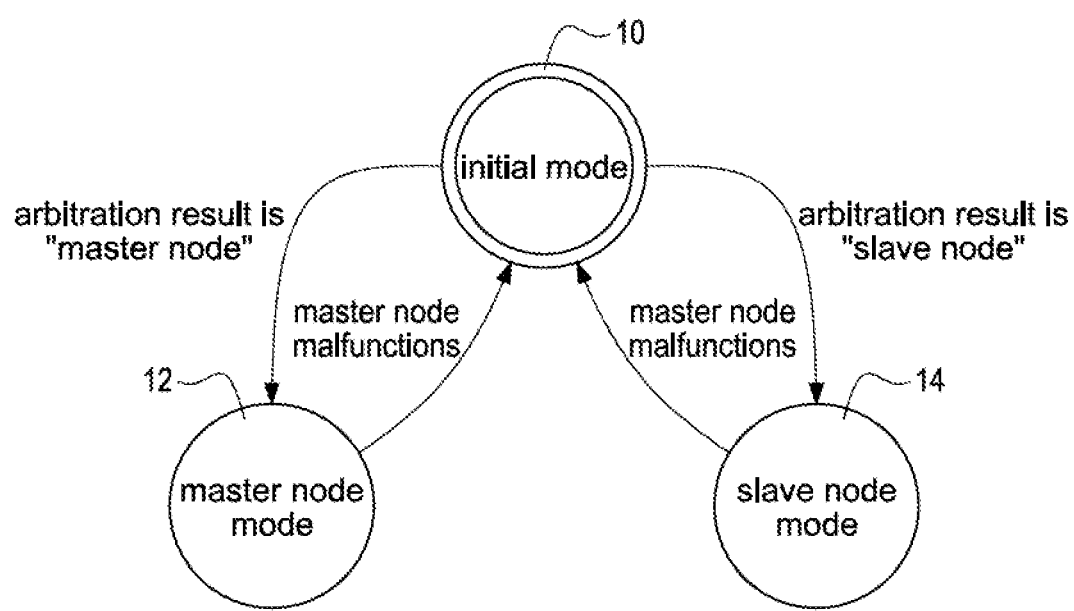
FIG. 1 is a schematic view of modes of master-slave architecture of the present disclosed example.

Please refer to FIG. 1, which is a schematic view of modes of master-slave architecture of the present disclosed example. In the present disclosed example, each node (such as power distribution unit 20-24 shown in FIG. 2 and power distribution unit 40-44 shown in FIG. 3) can switch between the initial mode 10, the master node 12 and the slave node mode 12 according to the requirement.

More specifically, under the initial mode 10, each node executes a master-node-arbitrating process (described later) to retrieve an arbitration result (comprising two results of "master node" and "slave node"), and switches to the master node mode 12 for being the master node and executing above-mentioned master-node-related operation or switches to the slave node mode 14 for being the slave node and executing above-mentioned slave-node-related operation.

Besides, when detecting that the master node malfunctions, each node can switch to the initial mode 10 for executing the master-node-arbitrating process again and determining the new master node to provide the relay access point service continually.

Thus, when the master node malfunctions, the present disclosed example can replace the malfunctioned master node with another node for recovering network-connecting service, so as to provide the high availability network-connecting service.

Figure 2:
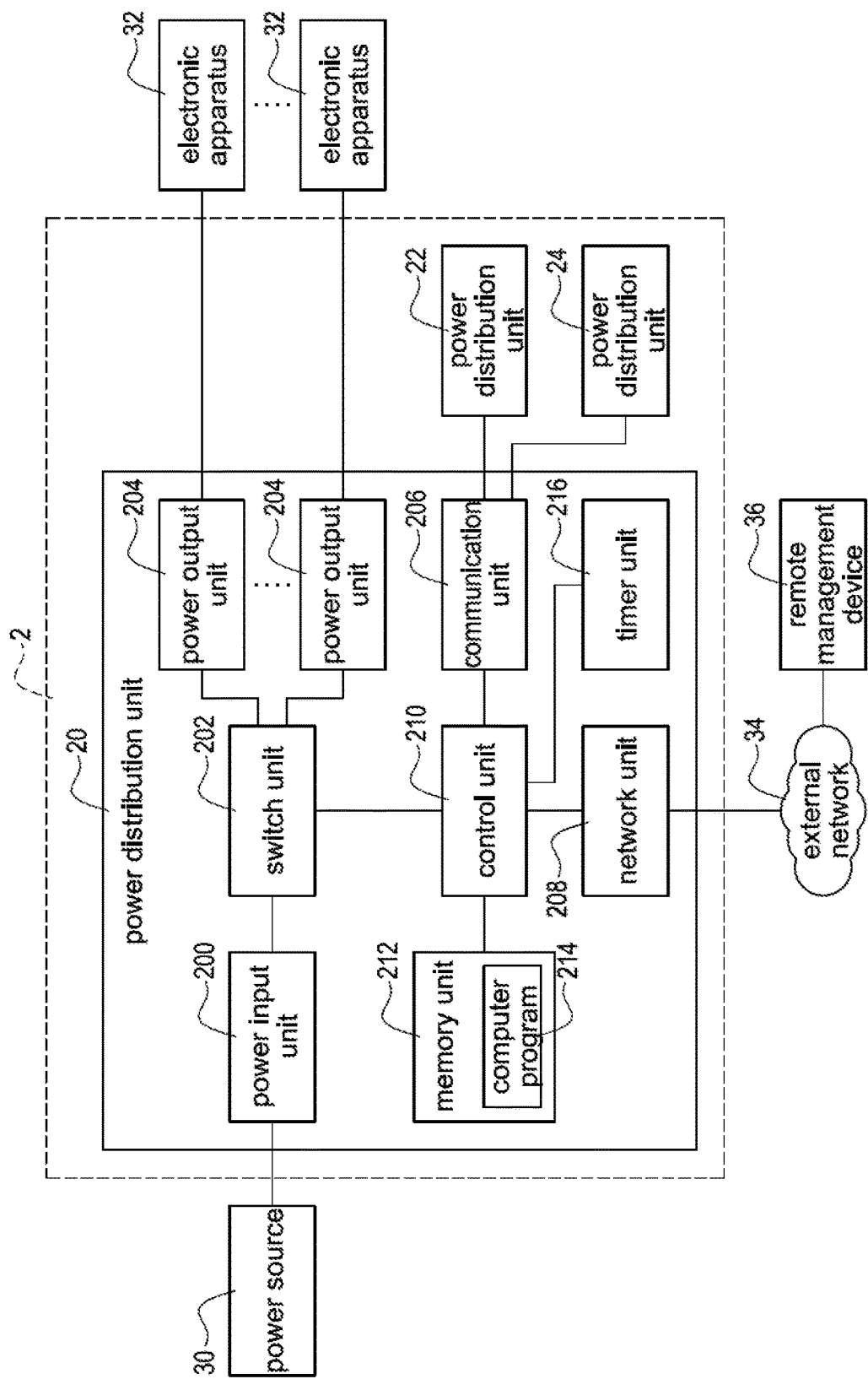
FIG. 2 is an architecture diagram of a power distribution system according to a first embodiment of the present disclosed example.

Please refer to FIG. 2, which is an architecture diagram of a power distribution system according to a first embodiment of the present disclosed example. a power distribution system 2 of the present disclosed example mainly comprise a plurality of power distribution units (take three power distribution units 20-24 for example in FIG. 2, and mainly take the power distribution unit 20 for explaining), an architecture of each power distribution units 20-24 is the same or similar each other, the relevant description is omitted for brevity.

The power distribution unit 20 mainly comprises a power input unit 200, a switch unit 202, a plurality of power output units 204, a communication unit 206, a network unit 208 and a control 210.

The power input unit 200 (such as plug) is connected to a power source 30 (such as supply mains) for retrieving the input power. Each power output unit 204 (such as socket) is used to connected to an electronic apparatus 32 and provides the electric power to the electronic apparatus 32.

The switch unit 202 is connected to the power input unit 200 and the power output units 204, and is used to make a connection between the power input unit 200 and each power output unit 204 switch to disconnect or connect. More specifically, the switch unit 202 comprises a plurality of switches (not shown in figures), one end of each switch is connected to the power input unit 200, and another end of each switch is connected to the power output unit 204. The switch unit 202 can control each switch to make the circuit between the power input unit 200 and any power output unit 204 form an open circuit or a broken circuit. Thus, the switch unit 202 can distribute the input power to the specific power output unit 204 according to the user's requirement.

In one embodiment, the switch unit 202 can further comprise a power-processing unit (not shown in figures). The power-processing unit can execute a process (such as rectification process or step-down process) to the input power received by the power input unit, and transfer the processed input power to the power output unit 204.

The communication unit 206 is connected to the communication unit of the other power distribution units 22-24 via transmission cable, and is used to communicate with the other power distribution units 22-24. In one embodiment, when the power distribution unit 20 is under the slave node mode (namely, being the slave node), the communication 206 can receive the monitor command from another power distribution unit being the master node (such as one of the power distribution units 22-24). When the power distribution unit 20 is under the master node mode (namely, being the master node), the communication 206 can transfer the monitor command to the power distribution units 22-24 being the slave node.

In one embodiment, the communication 206 is to connect to a plurality of communication units of the other power distribution units 22-24 in series.

In one embodiment, the communication unit 206 is CAN bus (Controller Area Network bus) interface, RS-232 interface or the other serial communication interface.

Please be noted that because the serial communication interface has the advantages of very long transmission distance (the max transmission distance of CAN bus interface is 10 kilometers), strong anti-interference ability and easy to wire and so forth, compare to the general cluster system using Ethernet communication (the max transmission distance is less than 500 meters) which all the device must be arranged in the same region, the present disclosed example can provide better elasticity of arrangement (such as each power distribution unit 20-24 is arranged in the different factory or region).

The network unit 208 is used to connect to an external network 34 (such as internet). In one embodiment, when the power distribution unit 20 is the master node, the network unit 208 can connect to the remote management device 36 via the external network 34 and transfer data. When the power distribution unit 20 is the slave node, the network unit 208 can be shut down for saving power or kept in a standby status for fast connecting the external network 35 when being the master node.

The control unit 210 is electrically connected to the switch unit 202, the communication unit 206 and the network unit 208, and is used to control the power distribution unit 20. In one embodiment, under the initial mode 10, the control unit 210 can control the power distribution unit 20 to switch to the master node mode for being the master node or switch to the slave node mode for being the slave node according to the arbitration result of the master-node-arbitrating process, and implement the failover of network-connecting service (described later).

In one embodiment, the power distribution unit 20 can further comprise a timer unit 216 electrically connected to the control unit 210, the timer unit 216 is used to provide the current time or time an arbitration time interval.

Figure 3:
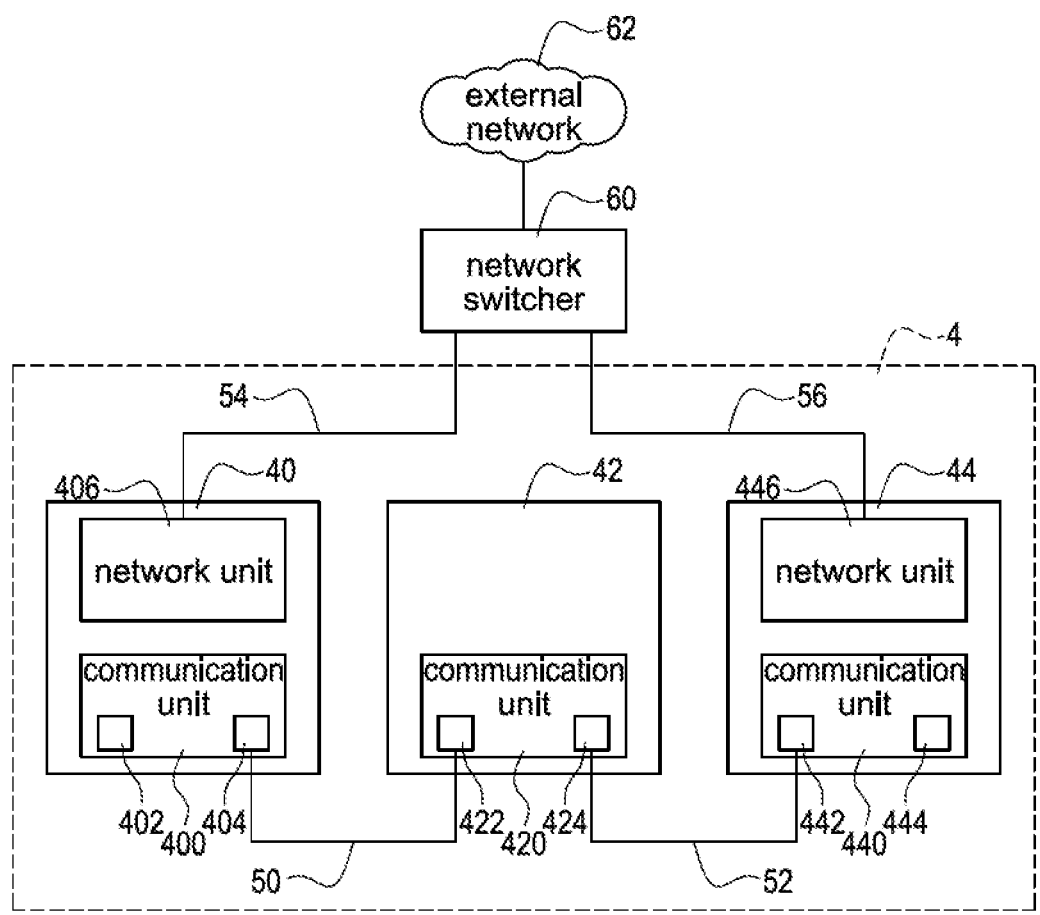
FIG. 3 is an architecture diagram of a power distribution system according to a second embodiment of the present disclosed example.

Please refer to FIG. 3, which is an architecture diagram of a power distribution system according to a second embodiment of the present disclosed example. The power distribution system 4, the power distribution unit 40-44, the network unit 406,446, and the communication unit 400-440 of this embodiment is same or similar to the power distribution system 2, the power distribution unit 20-24, the network unit 208, and the communication unit 206 shown in FIG. 2, the relevant description is omitted for brevity.

The difference between this embodiment and the first embodiment shown in FIG. 2 is that this embodiment is to connect the power distribution units 40-44 in one-to-one series. Besides, in this embodiments, only partial power distribution units 40, 44 have capable of connecting external network (namely, connecting the external network 62 via the network switcher 60).

More specifically, the communication unit 400 of the power distribution unit 40 comprises two connection ports 402, 404, and network unit 406 is connected to the network switcher 60 via the network cable 54 so as to connect to the external network 62 via the network switcher 60. The communication unit 420 of the power distribution unit 42 also comprises two connection ports 422, 424, and doesn't comprise the network unit such that disconnection of the external network 62. The communication unit 440 of the power distribution unit 44 comprises two connection ports 442, 444, and network unit 446 is connected to the network switcher 60 via the network cable 56 so as to connect to the external network 62 via the network switcher 60.

Besides, the connection port 404 of the power distribution unit 40 is connected to the connection port 422 of the power distribution unit 42 in series via the transmission cable 50, the connection port 424 of the power distribution unit 42 is connected to the connection port 442 of the power distribution unit 44 in series via the transmission cable 52, so as to form the Daisy Chain architecture.

After executing master-node-arbitrating process, the power distribution unit 40 is the master node, the power distribution units 42, 44 are the slave node. Then, the power distribution units 42-44 being the slave node can connect to the external network 62 for obtaining the ability of connecting external network via the transmission cable 50-52, the power distribution unit 40, the network cable 54 and the network switcher 60.

Besides, when the power distribution unit 40 malfunctions, the power distribution units 40-40 switch to the initial mode 10 and execute the master-node-arbitrating process again for network failover. After executing the master-node-arbitrating process, the power distribution unit 44 is the new master node, the power distribution unit 40, 42 are the slave node. Then, the power distribution units 40-42 being the slave node can connect to the external network 62 via the transmission cable 50-52, the power distribution unit 44, the network cable 56 and the network switcher 60, so as to obtain the ability of connecting external network via network failover mechanism.

Thus, the power distribution unit 40, 44 connecting to the network switcher 60 can implement network failover each other.

Following description will explain a network-connecting relay method of each embodiment of the present disclosed example. Please be noted that the network-connecting relay method in each embodiment of the present disclosed example is mainly implemented by the power distribution 2 shown in FIG. 2 or the power distribution 4 shown in FIG. 3. For clearly explaining, following description will take the power distribution 2 shown in FIG. 2 for explanation.

Furthermore, the power distribution 20 can further comprise a memory unit 212 electrically connected to the control unit 210. The memory unit 212 stores a computer program 214. The computer program 214 contains computer-executable program codes or machine codes. After executing the computer program 214, the control unit 210 can perform each step of the network-connecting relay method of each embodiment of the present disclosed example.

Figure 4:
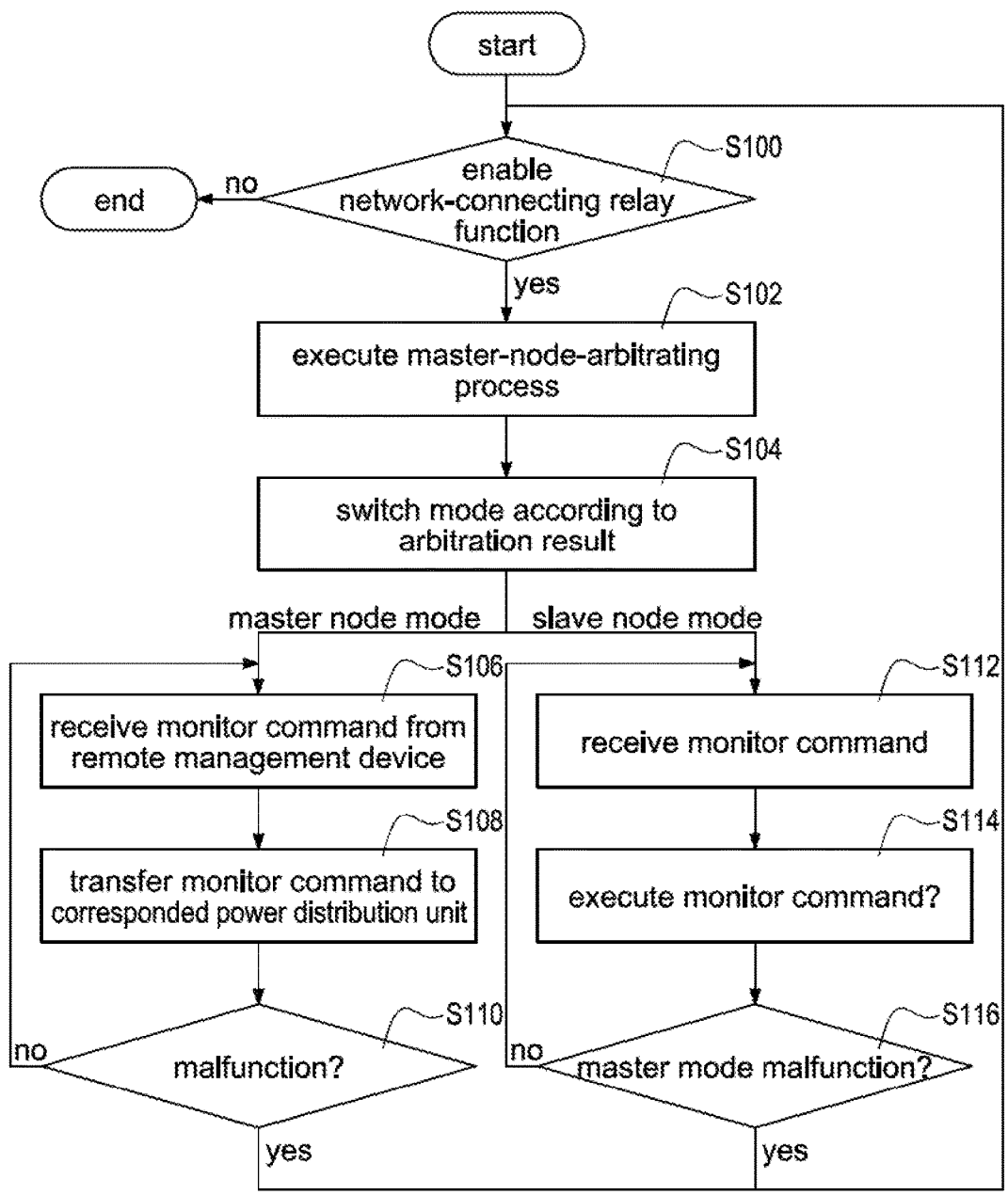
FIG. 4 is a flowchart of a network-connecting relay method according to a first embodiment of the present disclosed example.

Please refer to FIG. 2 and FIG. 4 together. FIG. 4 is a flowchart of a network-connecting relay method according to a first embodiment of the present disclosed example. The network-connecting relay method of this embodiment comprises following steps.

Step S100: the control unit 210 of the power distribution unit 20 detects whether a network-connecting relay function is enabled. If the control unit 210 detects that the network-connecting relay function is enabled, the control unit 210 performs step S102. Otherwise, the control unit 210 terminals the network-connecting relay method.

Step S102: the control unit 210 executes master-node-arbitrating process with the other power distribution units 22-24 for generating the arbitration result respectively. More specifically, when the power distribution unit 20 is executing the master-node-arbitrating process, the power distribution units 22-24 are also executing the master-node-arbitrating process via their control unit in the same time. In one embodiment, above-mentioned arbitration result comprises two results being "master node" and "slave node".

In another embodiment of the present disclosed example, the arbitration result can be expressed numerically. For example, it means that the arbitration result is "master node" if the arbitration result is "0", and it means that the arbitration result is "slave node" if the arbitration result is "1", but this specific example is not intended to limit the scope of the present disclosed example.

Step S104: the control unit 210 controls the power distribution unit 20 to switch according to the arbitration result to the master node mode 12 (if the arbitration result is "master node") for being the master node or the slave node mode 14 (if the arbitration result is "slave node") for being the slave node.

Then, if the control unit 210 is to control the power distribution unit 20 to be the master node (namely, the power distribution units 22-24 are the slave mode), the control unit 210 performs the step S106. If the control unit 210 is to control the power distribution unit 20 to be the slave node (namely, one of the power distribution units 22-24 is the master mode), the control unit 210 performs the step S112.

Step S106: the control unit 210 receives the monitor command form the remote management device 36 via the network unit 208 and the external network 34 when the power distribution unit 20 is the master node.

More specifically, the user can operate the remote management device 36 to connect to the power distribution unit 20 being the master node via the external network 34, and remotely operate the power distribution units 22-24 being the slave node in the way of transferring the monitor command via the power distribution unit 20.

Step S108: the control unit 210 transfers the received monitor command to the power distribution units 22-24 corresponded to a destination field of the monitor command. In one embodiment, the control unit 210 selects the specific slave node (take power distribution unit 22 for example) according to the destination field of the monitor command, and transfers the monitor command to the power distribution unit 22.

Step S110: the control unit 210 determines whether the power distribution unit 20 malfunctions (such as the device being abnormal or disconnection of the external network 34).

If the control unit 210 determines that the power distribution unit 20 malfunctions and has not capable of providing the service of connecting to the external network, the control unit 210 executes the steps S100-S104 again for making one of the slave nodes (namely, the power distribution units 22-24) be the new master node via executing the master-node-arbitrating process again for implementing the failover of network-connecting service. Otherwise, the control unit 210 performs the step S106 for providing network-connecting service continuously.

In one embodiment, when the control unit 210 determines that the power distribution unit 20 malfunctions, the control unit 210 performs the steps S100-S104 under the master node mode 12, but this specific example is not intended to limit the scope of the present disclosed example.

In another embodiment of the present disclosed example, the control unit 210 can leave the master node mode 12 and switch to the initial mode 10 automatically when determining that the power distribution unit 20 malfunctions, and perform the steps S100-S104 under the initial mode 10.

If the control unit 210 controls the power distribution unit 20 to be the slave node step (take the power distribution unit 20, 22 being the slave node and the power distribution unit 24 being the master node for example), the control unit 210 performs the step S112: the control unit 210 receives the monitor command from the power distribution unit 24 being the master node via the communication unit 206 when the power distribution unit 20 is the slave node.

Step S114: the control unit 210 executes the received monitor command.

Step S116: the control unit 210 determines whether the power distribution unit 24 being the master node malfunctions.

If the control unit 210 determines that the power distribution unit 24 malfunctions, performs the step S100-S104 again for making one of the slave nodes (namely, the power distribution units 20-22) be the new master node via executing the master-node-arbitrating process again for implementing the failover of network-connecting service. Otherwise, the control unit 210 performs the step S112 again.

In one embodiment, the control unit 210 of the power distribution unit 24 can broadcast a heartbeat signal periodically via the communication unit 206 when the power distribution unit 24 being the master node operates normally. Besides, the power distribution unit 24 will stop broadcasting the heartbeat signal caused by the malfunction of network or device when the power distribution unit 24 malfunctions. Thus, the power distribution units 20-22 being the slave node can determine that the power distribution unit 20 operates normally when receiving above-mentioned heartbeat signal, and determine that the power distribution unit 20 malfunctions when failing to receive above-mentioned heartbeat signal overtime.

Furthermore, the power distribution units 20-22 being the slave nodes can perform the steps S100-S104 under the slave node mode 14 after determining that the master node malfunctions, but this specific example is not intended to limit the scope of the present disclosed example.

In another embodiment of the present disclosed example, the power distribution units 20-22 being the slave nodes can leave the slave node mode 14 automatically, switch to the initial mode 10, and perform the steps S100-S104 under the initial mode 10 after determining that the master node malfunctions.

The present disclosed examples can effectively reduce the complexity of building system, reduce the cost of building system and provide failover of network-connecting relay service.

Figure 5:
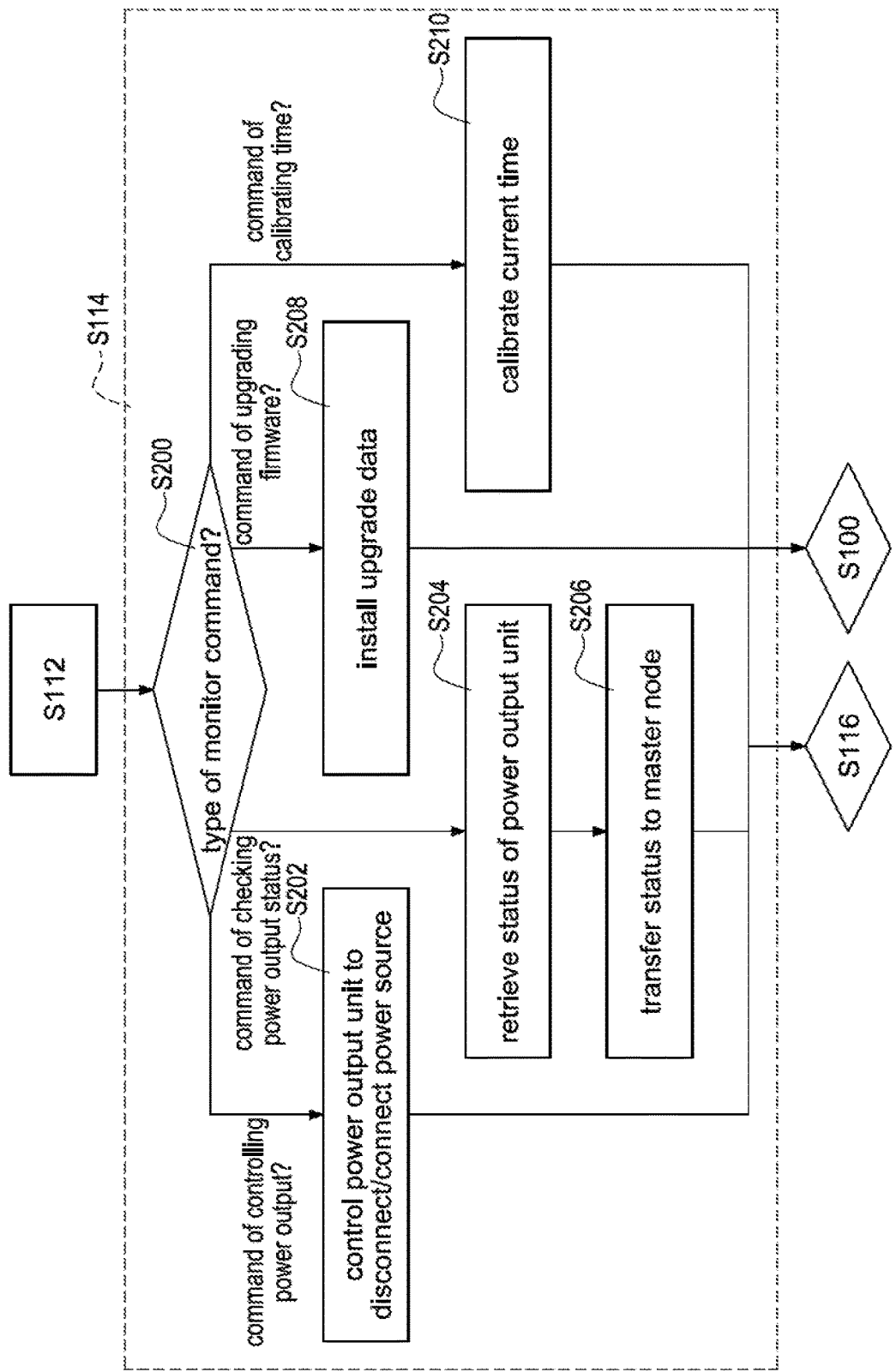
FIG. 5 is a partial flowchart of a network-connecting relay method according to a second embodiment of the present disclosed example.

Please refer to FIG. 5, which is a partial flowchart of a network-connecting relay method according to a second embodiment of the present disclosed example. The difference between this embodiment and the first embodiment shown in FIG. 4 is that the step S114 of the network-connecting relay method of this embodiment comprises the steps S200-S210 used to execute the different types of monitor commands. The embodiment of FIG. 4 takes the power distribution unit 20-22 being the slave nodes and the power distribution unit 24 being the master node for example.

Step S200: the control unit 210 recognizes the type of the received monitor command when being the slave node.

If the control unit 210 recognizes that the received monitor command is a command of controlling power output, the control unit 210 performs step S202: the control unit 210 controls a connection between the power input unit 200 and the specific power output unit 204 to disconnect or connect according to the command of controlling power output for transferring or stopping transferring the electric power of the power source 30 to the specific power output unit 204 when being the slave node. Thus, the user can remotely control each power output unit 204 to switch on/off. Then, the control unit 210 performs the step S116.

If the control unit 210 recognizes that the received monitor command is a command of checking power output status, the control unit 210 performs step S204: the control unit 210 retrieves a status of all or partial power output unit 204 according to the command of checking power output status when being the slave node.

Step S206: the control unit 210 transfers the retrieved status of the power output unit 204 to the power distribution unit 24 being the master node for make the master node forward the status of the slave node (namely, the power distribution unit 20 or 30) to the remote management device. Thus, the user can remotely monitor the status of the slave nodes. Then, the control unit 210 performs step S116.

If the control unit 210 recognizes that the received monitor command is a command of upgrading firmware, the control unit 210 performs step S208: the control unit 210 executes the command of upgrading firmware automatically to install an upgrade data of the command of upgrading firmware in the memory 212 when being the slave node. Thus, the user can remotely upgrade the firmware or software of the slave node.

Please be noted that, because the upgraded slave node could have or restore the capable of connecting the external network, and has the qualification to be the master node.

Thus, in this embodiment, the control unit 210 can perform steps S100-S104 after performing the step S208 for determining that whether the upgraded slave node is more suitable as the new master node than the current master mode.

If the control unit 210 recognizes that the received monitor command is a command of calibrating time, the control unit 210 performs step S210: the control unit 210 executes the command of calibrating time for calibrating current time of the timer unit 216 to a calibrating time of the monitor command when being the slave node. Thus, the user can remotely calibrate the system time of the slave node via the remote management device 36. Then, the control unit 210 performs the step S116.

Although this embodiment takes the command of controlling power output, the command of checking power output status, the command of upgrading firmware and the command of calibrating time for explaining the monitor command, but this specific example is not intended to limit the scope of the present disclosed example. The type of the monitor command may be modified or enhanced by person skilled in the art of the present disclosed example according to the person's requirement without departing from the concepts of this present disclosed example.

Please be noted that if the destination field of the monitor command is the power distribution unit 24 being the master node, the master node can execute the monitor command according to the steps shown in FIG. 5 without forwarding the monitor command to the slave node after receiving the monitor command via the external network 34.

Figure 6:
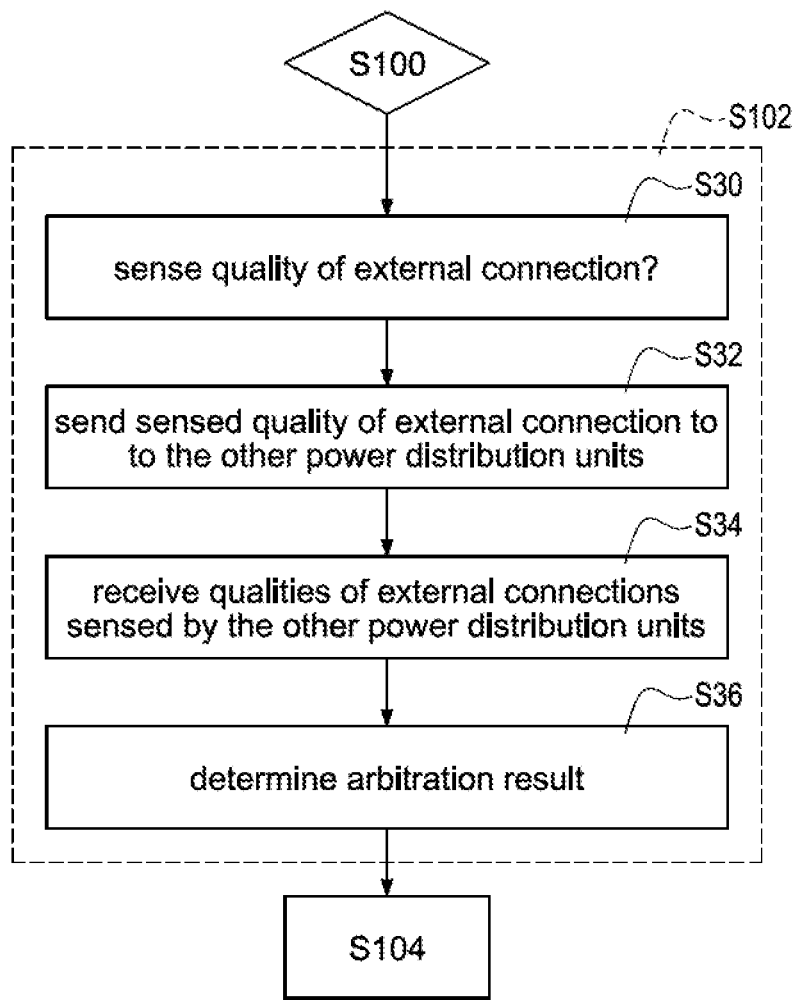
FIG. 6 is a partial flowchart of a network-connecting relay method according to a third embodiment of the present disclosed example.

Please refer to FIG. 6, which is a partial flowchart of a network-connecting relay method according to a third embodiment of the present disclosed example. The difference between this embodiment and the first embodiment shown in FIG. 4 is that the step S102 of the network-connecting relay method of this embodiment comprises the steps S30-S36. The embodiment of FIG. 4 takes the power distribution unit 20 for example.

Step S30: the control unit 210 of the power distribution unit 20 senses the own quality of external connection between the power distribution unit 20 and the external network 34.

In one embodiment, the control unit 210 determines the quantized quality of external connection (for example, the quality score can be any value between 0-10) according to whether the power distribution unit 20 has capable of connecting to the external network, the network speed of connecting to the external network 34 or response time of the remote management device 36.

In another embodiment of the present disclosed example, the quality of external connection is Boolean value which only comprises two qualities of 0 (disconnection of the external network 34) or 1 (having capable of connecting external network 34).

Step S32: the control unit 210 broadcasts the sensed quality of external connection to the other power input units 22-24 via the communication unit 206.

Step S34: the control unit 210 receives the qualities of external connections sensed by the other power input units 22-24 via the communication unit 206.

Step S36: the control unit 210 determines the arbitration result according to the received qualities of external connections and the sensed quality of external connection.

Via determining the arbitration result according to the quality of external connection of each power distribution unit, the present disclosed example can make the determined master node have better quality of external connection so as to provide the better network-connecting service.

Figure 7:
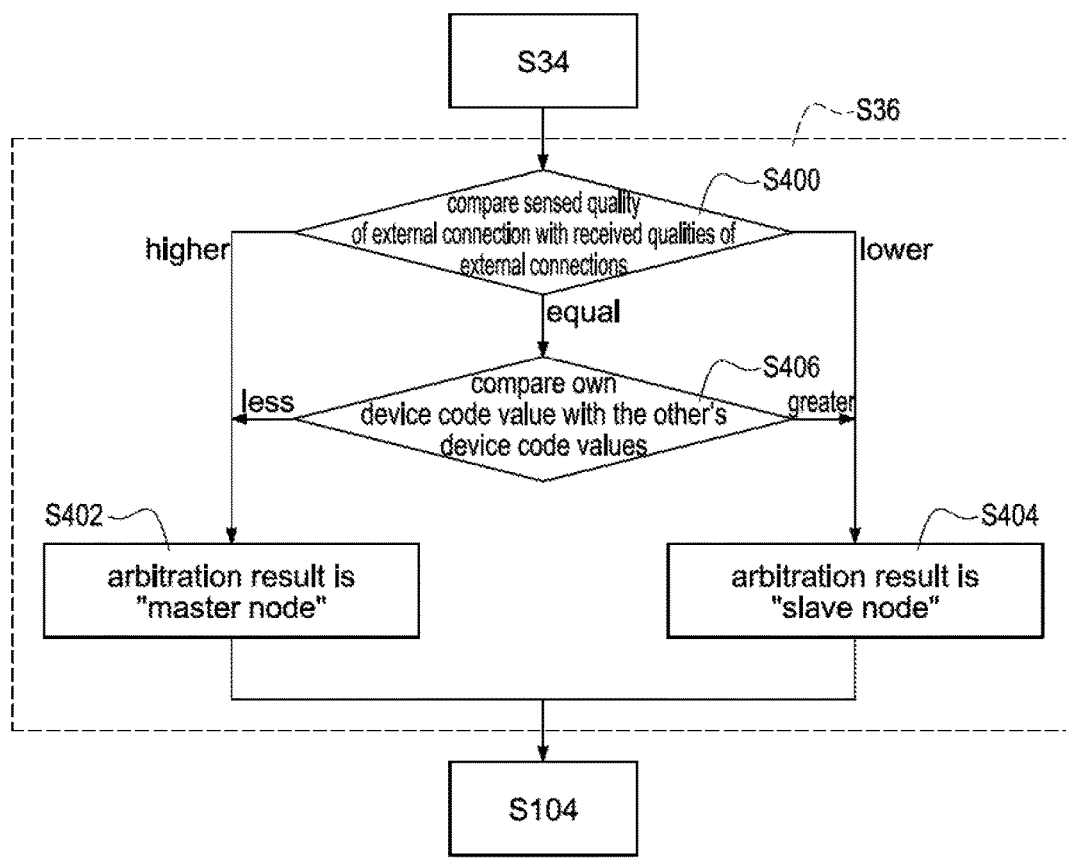
FIG. 7 is a partial flowchart of a network-connecting relay method according to a fourth embodiment of the present disclosed example.

Please refer to FIG. 7, which is a partial flowchart of a network-connecting relay method according to a fourth embodiment of the present disclosed example. The difference between this embodiment and the third embodiment shown in FIG. 4 and FIG. 6 is that the step S36 of the network-connecting relay method of this embodiment comprises the steps S400-S406.

Step S400: the control unit 210 of the power distribution unit 20 compares the received qualities of external connections with the sensed quality of external connection.

If the control unit 210 determines that the sensed quality of external connection is higher than all the received qualities of external connections, the control unit 210 performs a step S402: the control unit 210 determining that the arbitration result is "master node".

If the control unit 210 determines that the sensed quality of external connection is lower than any received quality of external connection, the control unit 210 performs a step S404: the control unit 210 determining that the arbitration result is "slave node".

If the control unit 210 determines that the sensed quality of external connection is highest and equal to any received quality of external connection, the control unit 210 performs a step S406.

Step S406: the control unit 210 retrieves the device code value of the power distribution unit 20 and the device code value of another power distribution unit having the same and highest quality of external connection (take power distribution unit 22 for example), and compares the two device code values.

In one embodiment, above-mentioned device code value is the device ID or MAC address of each power distribution unit.

If the control unit 210 determines that the device code value of the power distribution unit 20 is less than the device code value of the power distribution unit 22, the control unit 210 performs a step S402 for configuring the arbitration result to be "master node".

If the control unit 210 determines that the device code value of the power distribution unit 20 is greater than the device code value of the power distribution unit 22, the control unit 210 performs a step S404 for configuring the arbitration result to be "slave node".

Please be noted that because the device code value is generated in a way of sequentially numbering, there are not any two power distribution devices having the same device code value in the same power distribution system.

Via determining the arbitration result according to the device code value being not repeatable when the qualities of external connections are the same, the present disclosed example can effectively exclude the status of having not capable of determining the arbitration result.

Although this embodiment compares the device code values when the qualities of external connections is the same, but this specific example is not intended to limit the scope of the present disclosed example. In another embodiment of the present disclosed example, the device code value can be replace with the other values, such as arrangement time, the continuous running time, processing resource usage rate or the other pre-default values of each power distribution device 20-24. In one embodiment, the master-node-arbitrating process randomly selects one of the power distribution units having the same quality of external connection to be the master node.

In another embodiment of the present disclosed example, the user can configure a pre-default priority order in advance, such as the priority of the power distribution unit 20 is higher than the priority of the power distribution unit 22, the priority of the power distribution unit 22 is higher than the priority of the power distribution unit 24. When the qualities of external connections are the same, the control unit 210 determines the arbitration result according to the pre-default priority order. For example, if the quality of external connection of the power distribution unit 20 and the quality of external connection of the power distribution unit 22 are the same and highest, because the priority of the power distribution unit 20 is higher than the priority of the power distribution unit 22, the arbitration result of the power distribution unit 20 is "master node", the arbitration result of the power distribution unit 22 is "slave node". Thus, the present disclosed example can execute arbitration according to the user's expectation.

Figure 8:
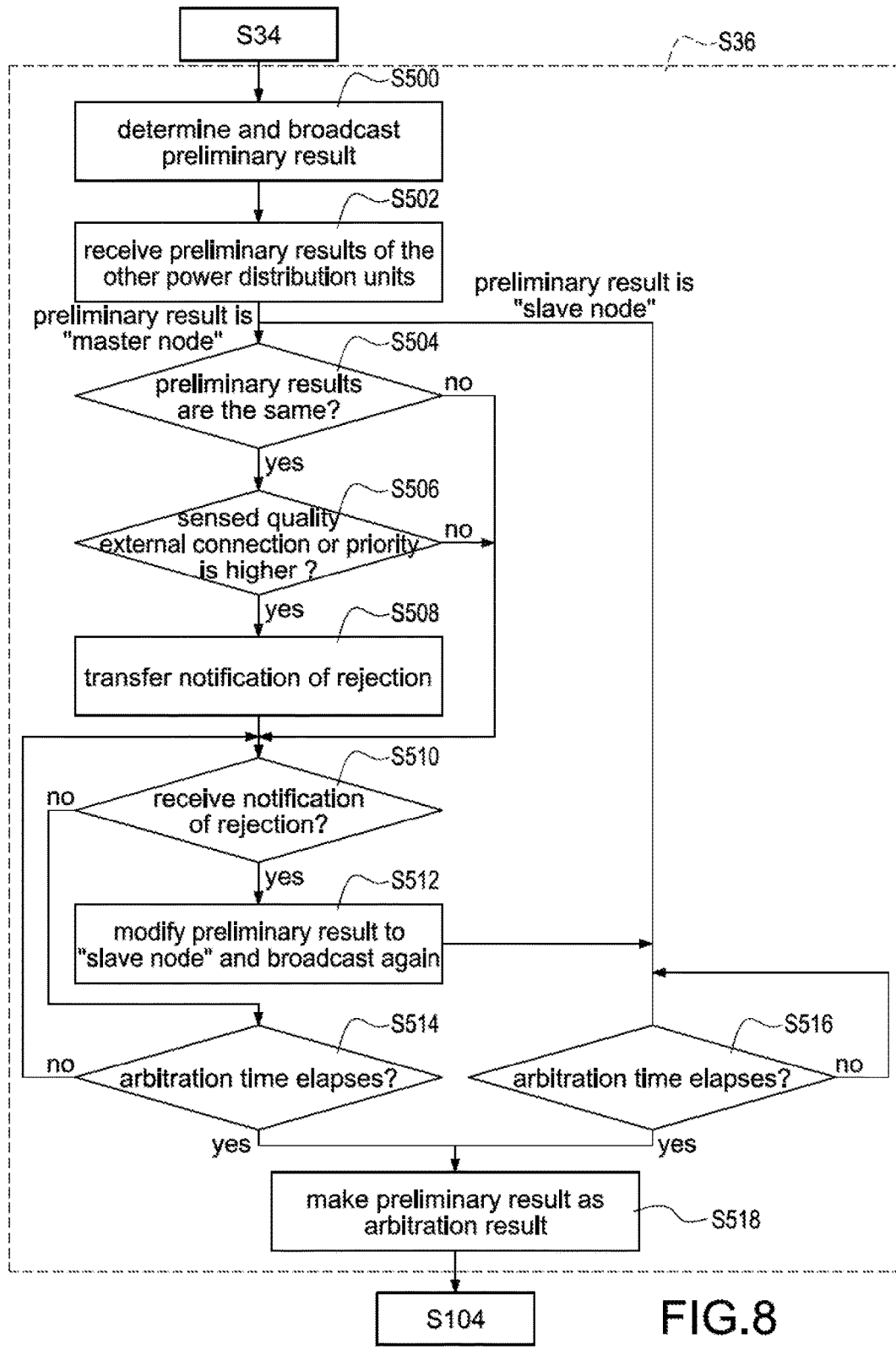
FIG. 8 is a partial flowchart of a network-connecting relay method according to a fifth embodiment of the present disclosed example.

Please refer to FIG. 8, which is a partial flowchart of a network-connecting relay method according to a fifth embodiment of the present disclosed example. The difference between this embodiment and the third embodiment shown in FIG. 4 and FIG. 6 is that the step S36 of the network-connecting relay method of this embodiment comprises the steps S500-S518.

Step S500: the control unit 210 of the power distribution unit 20 determines a preliminary result according to the sensed quality of external connection, and broadcasts the determined preliminary result to the other power distribution units 22-24.

In one embodiment, the power distribution unit 20 configures the preliminary result to be "slave node" when disconnection of the external network 34, and configures the preliminary result to be "master node" when having capable of connecting to the external network 34.

In another embodiment of the present disclosed example, the preliminary result can be expressed numerically. For example, it means that the preliminary result is "master node" if the preliminary result is "0", and it means that the preliminary result is "slave node" if the preliminary result is "1", but this specific example is not intended to limit the scope of the present disclosed example.

Step S502: the control unit 210 receives the preliminary results determined by the other power distribution unit 22-24 form the other power distribution unit 22-24 via the communication unit 206.

Then, if the preliminary result determined by the control unit 210 in the step S500 is "master node", the control unit 210 performs the steps S504-S514. If the preliminary result determined by the control unit 210 in the step S500 is "slave node", the control unit 210 performs the steps S516.

Step S504: the control unit 210 determines whether the determined preliminary result is same as any received preliminary result.

If the control unit 210 determines that the determined preliminary result is same as any received preliminary result (take the preliminary result of the power distribution unit 22 for example), the control unit 210 performs the step S506. Otherwise, the control unit 210 performs the step S510.

Step S506: the control unit 210 determines whether the sensed quality of external connection is higher than the quality of external connection of the power distribution unit 22 having the same preliminary result (if the quality of external connection is not Boolean value), or determines whether own priority is higher than the priority of the power distribution unit 22 having the same preliminary result.

If the control unit 210 determines that own priority or the sensed quality of external connection is higher than the priority or the quality of external connection of the power distribution unit 22 having the same preliminary result, the control unit 210 performs a step S508. Otherwise, the control unit 210 performs a step S510.

Step S508: the control unit 210 transfers a notification of rejection to the power distribution unit 22 having the same preliminary result via the communication unit 206 for making the power distribution unit 22 modify its preliminary result.

Step S510: the control unit 210 determines whether the control unit 210 receives any notification of rejection from any power distribution unit 22-24 via the communication unit 206.

If the control unit 210 receives any notification of rejection, performs a step S512. Otherwise, the control unit 210 performs a step S514.

Step S512: the control unit 210 modifies the preliminary result to "slave node" when receiving the notification of rejection, and broadcasts new modified preliminary result to the other power distribution unit 22-24. Then, the control unit 210 performs a step S516.

If the control unit 210 does not receive any notification of rejection in step S510, performs a step S514: the control unit 210 starting to time a pre-default arbitration time interval (such as 30 seconds) via the timer unit 216 after broadcasting the preliminary result, and determining whether the arbitration time elapses.

If the control unit 210 determines that the arbitration time elapses, performs a step S518. Otherwise, the control unit 210 performs the step S510 again for monitoring whether receive the notification of rejection continually.

If the preliminary result determined in the step S500 is "slave node", or is modified to "slave node" in the step S516 by the control unit 210, the control unit 210 performs a step S516: the control unit 210 starting to time the pre-default arbitration time interval via the timer unit 216 after broadcasting the preliminary result, and determining whether the arbitration time elapses.

If the control unit 210 determines that the arbitration time elapses, performs a step S518. Otherwise, the control unit 210 performs the step S516 again for waiting continually.

Step S518: the control unit 210 makes the preliminary result as the final arbitration result after the arbitration time elapses, and completes the master-node-arbitrating process.

Via determine the arbitration result of the master-node-arbitrating process by the power output units 20-24 in way of objection, the present disclosed example can make the power output units 20-24 provide the computing resource needed by executing master-node-arbitrating process together, so as to increase the decision speed via distributed computing.

Besides, because the master-node-arbitrating process of the present disclosed example is divisionally executed in the power output units 20-24, the present disclosed example can effectively prevent the system from having not capable of executing the master-node-arbitrating process caused by single point of failure (such as the specific power distribution unit being responsible for executing the master-node-arbitrating process malfunctions) in the traditional centralized architecture.

The above mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A network-connecting relay method, the network-connecting relay method being adopted in a power distribution system comprising a plurality of power distribution units, the network-connecting relay method comprising:
   a) each power distribution unit sensing a quality of external connection of the external network respectively;
   b) broadcasting the sensed quality of external connection to another power distribution unit;
   c) receiving the quality of external connection sensed by another power distribution unit;
   d) determining arbitration result according to the qualities of external connections;
   e) each power distribution unit switching to a master node mode for functioning as a master node or switching to a slave node mode for functioning as a slave node according to the arbitration result;
   f) when functioning as the master node, receiving a monitor command from a remote management device via an external network, and transferring the monitor command to the corresponded slave node; and
   g) when functioning as the slave node, executing the monitor command received from the master node.

2. The network-connecting relay method according to claim 1, wherein the monitor command is a command for controlling power output, the step g is to control a connection between a power input unit and a power output unit of the slave node to disconnect or connect.

3. The network-connecting relay method according to claim 1, wherein the step d comprises:
   d1) determining that the arbitration result is "master node" when the sensed quality of external connection is determined to be higher than all the received quality of external connection; and
   d2) determining that the arbitration result is "slave node" when the sensed quality of external connection is determined to be lower than any received quality of external connection.

4. The network-connecting relay method according to claim 3, wherein the step d further comprises:
   d3) when the sensed quality of external connection and at least one received quality of external connection are determined to be highest, determining the arbitration result via comparing a device code value of the power distribution unit with a device code value of another power distribution unit having the same quality of external connection.

5. The network-connecting relay method according to claim 4, wherein the device code value is a device ID or a MAC address, the step d3 is to determine that the arbitration result is "master node" when the device code value of the power distribution unit is less than the device code value of another power distribution unit having the same quality of external connection, and determining that the arbitration result is "slave node" when the device code value of the power distribution unit is greater than the device code value of another power distribution unit having the same quality of external connection.

6. The network-connecting relay method according to claim 3, wherein the step d further comprises:
   d4) when the sensed quality of external connection and at least one received quality of external connection are determined to be highest, determining the arbitration result according to a pre-default priority.

7. The network-connecting relay method according to claim 1, wherein the step d comprises:
   d5) each power distribution unit determining and broadcasting a preliminary result to another power distribution unit according to the sensed quality of external connection;
   d6) transferring a notification of rejection to the power distribution unit having the same preliminary result when the preliminary result is "master node" and same as any received preliminary result, and a priority of the power distribution unit is higher than a priority of the power distribution unit having the same preliminary result;
   d7) modifying the determined preliminary result to "slave node" and broadcasting the modified preliminary result when receiving any notification of rejection; and
   d8) making the preliminary result as the arbitration result after an arbitration time elapses.

8. The network-connecting relay method according to claim 1, wherein the network-connecting relay method further comprises:
   h) executing the step a to the step e for making one of the slave nodes function as the new master node for network failover when the master node is determined to malfunction.

9. The network-connecting relay method according to claim 8, wherein the step h comprises:
   h1) when functioning as the slave node and detecting that the master node fails to respond within a period or is disconnected from the external network, determining that the master node malfunctions and executing the step a to the step e; and
   h7) when functioning as the master node and detecting the malfunction on its own, executing the step a to the step e.

10. A power distribution unit capable of network-connecting relay, comprising:
   a control unit, controlling the power distribution unit to switch to a master node mode for making the power distribution unit function as a master node or switch to a slave node mode for making the power distribution unit function as a slave node;
   a network unit electrically connected to the control unit, receiving a monitor command from a remote management device when the power distribution unit is the master node; and
   a communication unit electrically connected to the control unit, when the power distribution unit functions as the master node, the communication unit transferring the monitor command to another power distribution unit functioning as the slave node, when the power distribution unit functions as the slave node, the communication unit receiving a monitor command from another power distribution unit functioning as the master node,
   wherein the control unit executes a master-node-arbitrating process with another power distribution unit for generating an arbitration result when the power distribution unit functions as slave node and the master node malfunctions, and determines whether the control unit controls the power distribution unit to switch to the master node mode for making the power distribution unit function as the new master node for network-connecting relay;
   wherein the control unit executes the master-node-arbitrating process to sense a quality of external connection via the network unit, broadcast the sensed quality of external connection to another power distribution unit, receive the quality of external connection sensed by another power distribution unit via the communication unit, and determine the arbitration result according to the qualities of external connections.

11. The power distribution unit capable of network-connecting relay according to claim 10, wherein during executing the master-node-arbitrating process, the control unit determines that the arbitration result is "master node" when the sensed quality of external connection is determined to be higher than all received quality of external connection, and determines that the arbitration result is "slave node" when the sensed quality of external connection is determined to be lower than any received quality of external connection.

12. The power distribution unit capable of network-connecting relay according to claim 11, wherein during executing the master-node-arbitrating process, when the sensed quality of external connection and at least one received quality of external connection are determined to be highest, the control unit compares a device code value of the power distribution unit with a device code value of another power distribution unit having the same quality of external connection, wherein the control unit determines that the arbitration result is "master node" when the device code value of the power distribution unit is less than the device code value of another power distribution unit having the same quality of external connection, and determines that the arbitration result is "slave node" when the device code value of the power distribution unit is greater than the device code value of another power distribution unit having the same quality of external connection.

13. The power distribution unit capable of network-connecting relay according to claim 12, wherein the device code value is a device ID or a MAC address of the power distribution unit.

14. The power distribution unit capable of network-connecting relay according to claim 10, further comprising a memory unit electrically connected to the control unit, the memory unit storing a priority, wherein during executing the master-node-arbitrating process, the control unit determines the arbitration result according to the priority when the sensed quality of external connection and at least one received quality of external connection are determined to be highest.

15. The power distribution unit capable of network-connecting relay according to claim 10, further comprising a timer unit electrically connected to the control unit, wherein during executing the master-node-arbitrating process, the control unit determines a preliminary result according to the sensed quality of external connection, and broadcasts the preliminary result to another power distribution unit via the communication unit, the control unit transfers a notification of rejection to the power distribution unit having the same preliminary result when the preliminary result is "master node" and same as any received preliminary result, and a priority of the power distribution unit is higher than a priority of the power distribution unit having the same preliminary result, modifies the determined preliminary result to "slave node" and broadcasts the modified preliminary result when receiving any notification of rejection, and makes the preliminary result as the arbitration result after an arbitration time elapses via the timer unit timing.

16. The power distribution unit capable of network-connecting relay according to claim 10, wherein the control unit determines that the master node malfunctions when the power distribution unit functions as the slave node and detects that the master node fails to respond within a period or is disconnected from the external network, and leaves the master node mode and executes the master-node-arbitrating process when functioning as the master node and detecting the malfunction on its own.

17. The power distribution unit capable of network-connecting relay according to claim 10, wherein the communication unit is to connect to a communication unit of another power distribution unit in series via a transmission cable.

18. The power distribution unit capable of network-connecting relay according to claim 10, wherein the communication unit is CAN bus interface, RS-232 interface or the other serial communication interface.

19. A power distribution system capable of network-connecting relay, comprising:
a plurality of power distribution units according to claim 10, each power distribution unit operates respectively in the master node mode for functioning as the master node or in the slave node mode for functioning as the slave node according to the arbitration result of the master-node-arbitrating process.

* * * * *